Oct. 15, 1935.  S. G. DOWN  2,017,689
ELECTRICALLY CONTROLLED BRAKE VALVE
Filed April 28, 1934
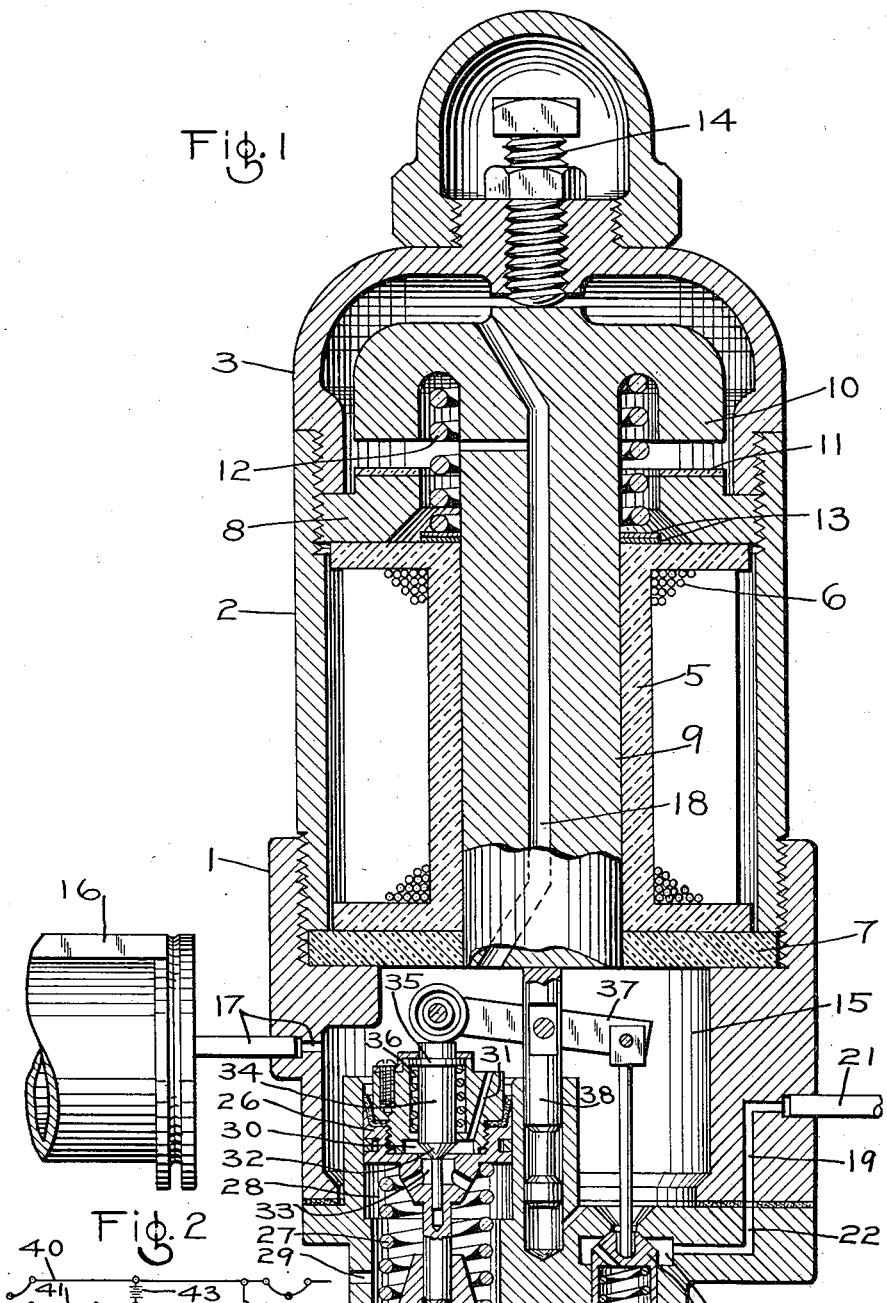
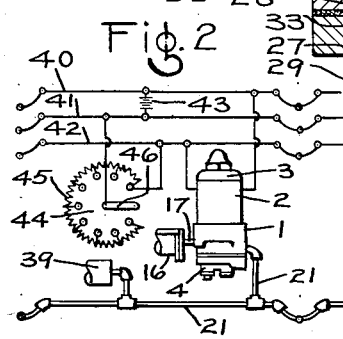
INVENTOR
SIDNEY G. DOWN
BY *Wm. M. Cady*
ATTORNEY Patented Oct. 15, 1935

2,017,689

UNITED STATES PATENT OFFICE 2,017,689

ELECTRICALLY CONTROLLED BRAKE VALVE

Sidney G. Down, Edgewood, Pa., assignor to The Westinghouse Air Brake Company, Wilmerding, Pa., a corporation of Pennsylvania Application April 28, 1934, Serial No. 722,904

1 Claim. (Cl. 303—20)

This invention relates to fluid pressure brake apparatus and more particularly to the self-lapping brake controlling valve device therefor.

The principal object of the invention is to provide an improved electrically controlled self-lapping brake controlling valve device.

Another object of the invention is to provide an electrically controlled self-lapping brake valve device in which the electrical controlling portion, while being adapted to be subjected to fluid at brake cylinder pressure, will not be influenced by such fluid pressure in its operation to control either the application or release of the brakes.

Other objects and advantages of the invention will appear in the following more detailed description.

In the accompanying drawing Fig. 1 is a vertical sectional view of a brake controlling valve device constructed in accordance with the invention, and Fig. 2 is a diagrammatic view illustrating the circuit system for controlling the brake controlling valve device.

As shown in the drawing, the electrically controlled brake controlling valve device comprises a main casing section 1, a casing section 2 which at its lower end has screw-threaded connection with the upper end of the section 1, a cap section 3 having screw-threaded connection with the upper end of the section 2, and a casing section 4 which is removably secured to the lower end of the section 1 by means of bolts or any other suitable removable means.

Contained within the casing section 2 is a hollow spool 5 of insulating material on which is wound a magnet winding 6, said spool resting on an insulating member 7 which is carried by a shoulder formed on the casing section 1 and which is secured in place by the lower end of the casing section 2. The spool 5 is clamped in place by means of an annular member 8 which has screw-threaded connection with the upper end portion of the casing section 2.

Extending longitudinally through the spool 5 and through the members 7 and 8 is a plunger 9 which is adapted to be operatively controlled by the action of the winding 6. The upper end portion of the plunger 9 is enlarged and provided with a downwardly depending annular stop flange 10 which is adapted to engage an annular gasket 11 carried by the member 8 to limit the downward movement of the plunger.

When the winding 6 is deenergized, a spring 12, which is interposed between the spool 5 and the enlarged portion of the plunger, maintains the plunger in its upper position as shown in Fig. 1, there being a plurality of thin shims 13 interposed between the spool and the lower end of the spring.

By removing or adding shims 13 the gap between the stop faces of the flange 10 and annular gasket 11 may be adjusted as desired without varying the effective operating value of the spring 12. When the exact adjustment cannot be obtained by the use of the shims, a member 14 having screw-threaded connection with the cap section 3 of the casing is turned slightly in one direction or the other to make the final adjustment. It will here be noted that if such final adjustment is made it will be so slight that the resulting variation in the value of the spring will be negligible. The member 14 also serves to limit the upward movement of the plunger 9.

The casing section 1, casing section 4, and member 7 define a chamber 15 which is in constant open communication with a brake cylinder 16 through a passage and pipe 17 and which is also in constant open communication with both sides of the enlarged end portion of the plunger 9 by way of a passage 18 in the plunger.

The casing section 1 is provided with a supply passage 19 to which is open a supply pipe 21 leading from a reservoir 39 or from any other desired fluid pressure supply source. This passage 19 registers with a supply passage 22 in the casing section 4 leading to a supply valve chamber 23 containing a supply valve 24 which is adapted to be operated to control communication from the chamber 23 to the chamber 15 and which is normally maintained closed by a spring 25.

Slidably mounted in the casing section 4 is a movable regulating abutment or piston 26 having one side exposed to the chamber 15. The other side of the piston is subjected to the pressure of a regulating spring 27 contained in a chamber 28 open through a passage 29 to the atmosphere. Contained in a valve chamber 30 to which the chamber 15 is constantly open through a passage 31 is an exhaust valve 32 which is operative to control communication from the valve chamber 30 to an exhaust passage 33 leading to the regulating spring chamber 28. The exhaust valve 32 is provided with a stem 34 which projects beyond the face of the piston and a short distance inwardly from its end the stem is provided with a collar 35 which is adapted to engage with a portion of the piston to limit the opening movement of the valve and which forms a spring seat for a light coil spring 36 which is adapted to effect the opening movement of the valve.

Contained in the chamber 15 is a lever 37 for controlling the operation of the supply and exhaust valves 24 and 32 respectively, one end of the lever cooperating with the supply valve and the other end cooperating with the exhaust valve. This lever intermediate its ends is pivotally connected to a plunger 38 slidably mounted in the casing section 4 and through the medium of this plunger 38 the operation of the lever is adapted to be controlled. The upper end of the plunger 38 engages the lower end of the plunger 9, so that the plunger 9 controls the operation of the plunger 38.

It will be noted that since the brake cylinder pipe 17 and supply pipe 21 are both connected to the casing section 1, the casing section 4 and valve mechanism may be removed and replaced without disturbing the pipe connections. It will further be noted that upon the removal of the cap section 3 the plunger 9, spring 12 and shims 13 may be removed and replaced without disturbing the spool 5 and winding 6 and that upon the removal of both the cap section 3 and annular member 8 the magnet assembly as a whole may be removed without disturbing the pipe connections or the valve mechanism.

In Fig. 2 an electrical circuit system for controlling the operation of the brake controlling valve device is illustrated, which system comprises train wires 40, 41, and 42, a source of electric current such as a battery 43 connected across the wires 40 and 41 and a brake controlling switch device 44 comprising a variable resistance element 45 having one terminal connected to the wire 42. The switch device also comprises a contact arm 46 which is connected to the wire 41 and which is movable to open and close the circuit through the magnet winding 6 which is connected across the wires 40 and 42 as shown. Upon movement of the contact arm in a clockwise direction after it has been moved to circuit closing position will cause a portion of the resistance element 45 to be cut out of circuit with the magnet winding 6 and upon movement in the opposite direction will cause more of the resistance element to be cut in circuit. It will thus be seen that by the manipulation of the switch device 44 the current flow through the magnet winding 6 may be varied as desired.

In operation fluid under pressure supplied to the reservoir 39 in the usual manner in charging the equipment flows through pipe 21 and passages 19 and 22 to the supply valve chamber 23 of the brake controlling valve device.

With the apparatus in release position as shown in the drawing, the brake cylinder 16 is open to the atmosphere by way of pipe and passage 17, chamber 15, passage 31 in the regulating piston, exhaust valve chamber 30, passage 33, chamber 28 and passage 29.

When it is desired to effect an application of the brakes, the contact arm is moved into engagement with any one of the contacts of the resistance element 45, thus closing the circuit through the magnet winding 6 and battery 43 causing the winding to be energized.

Upon the energization of the magnet winding 6 the plunger 9 is caused to move downwardly against the opposing action of the spring 12. Now when the value of the spring 12 becomes substantially equal to the magnetic pull on the plunger 9, said spring acts to bring the plunger to a stop.

As the plunger 9 is thus moved it depresses the lever carrying plunger 38. It will here be understood that the supply valve spring 25 is heavier than the exhaust valve spring 36 so that upon the initial downward movement of the plungers 9 and 38, the lever 37 carried by the plunger 38 causes the exhaust valve 32 to move relative to the piston 26 and seat, thus closing the exhaust communication from the chamber 15 to the atmosphere.

After the exhaust valve 32 is thus seated the stem 34 thereof serves as a fulcrum for the engaging end of the lever, so that as the downward movement of the plunger continues, the other end of the lever is moved downwardly causing the supply valve 24 to be unseated against the opposing pressure of the spring 25.

With the supply valve unseated fluid under pressure, as supplied by the reservoir 39, flows from the supply valve chamber to the chamber 15 and from thence flows through passage and pipe 17 to the brake cylinder 16. Now when the pressure of fluid in chamber 15 and acting on the face of piston 26 is sufficient to overcome the opposing pressure of the spring 27, the piston moves downwardly permitting the spring 25 to seat the supply valve 24. With the supply valve seated the supply of fluid to the chamber 15 is cut off, so that the downward movement of the piston ceases, and since the exhaust valve is maintained closed by the lever 37 the valve mechanism remains in lap position until it is desired to increase or decrease the brake cylinder pressure.

When it is desired to increase the brake cylinder pressure the current flow through the magnet winding 6 is increased by the manipulation of the switch device 44. This causes the further downward movement of the plungers 9 and 38 and lever 37 so that the supply valve is again unseated and more fluid under pressure is supplied to the brake cylinder. When the desired brake cylinder pressure is obtained the valve mechanism operates automatically to lap position as before described.

When it is desired to decrease the brake cylinder pressure, the switch device 44 is manipulated to decrease the current flow through the magnet winding 6, whereupon the spring 12 acts to move the plunger 9 upwardly, said plunger coming to a stop when the spring is no longer able to overpower the magnetic pull on the plunger. As the plunger 9 is thus moved, the exhaust valve spring acts to unseat the exhaust valve, and through the medium of the valve stem 34 causes the end of the lever which is in engagement with the stem to move upwardly. Since the supply valve is closed and the spring 25 is heavier than the exhaust valve spring 36, the lever 37 as it is moved by the action of the spring 36 and valve stem 34 causes the plunger 38 to move upwardly and remain in contact with the lower end of the plunger 9.

Upon the unseating of the exhaust valve 32 fluid under pressure flows from the chamber 15 and connected brake cylinder by way of passage 31, exhaust valve chamber 30, passage 33, regulating spring chamber 28 and passage 29. Now when the pressure of fluid in chamber 28 and acting on the piston 26 is slightly less than the opposing pressure of the regulating spring 27, said spring causes the piston to move upwardly, and with the plungers 9 and 38 and lever 37 stationary, the piston engages the exhaust valve so as to close off the further flow of fluid from the chamber 15 and brake cylinder 16, thus limiting the reduction in brake cylinder pressure.

It will be noted that since the passage 18 leading from one side of the plunger to the other is constantly open the fluid pressures acting on opposite sides thereof will at all times be equalized, so that fluid under pressure in chamber 15 will at no time oppose the operation of the plunger toward brake applying position or assist in the operation of the plunger toward brake releasing position. Due to this the brake application can be more accurately varied at will than would otherwise be the case if brake cylinder pressure were permitted to influence the action of the plunger 9.

From the foregoing description it will be understood that the brake controlling valve device is electrically controlled to provide any desired brake cylinder pressure up to the equalized pressures of the brake cylinder 16 and reservoir 39 and that the device is automatically operable to lap position to limit the brake cylinder pressure in effecting either an application or a relief of the brakes.

It will also be understood that when the contact arm 46 is in circuit open position as shown in Fig. 2, the several parts of the brake controlling valve device will assume the position in which they are shown in Fig. 1, in which position the brake cylinder is completely vented to the atmosphere and in which the brakes are fully released.

While one illustrative embodiment of the invention has been described in detail, it is not my intention to limit its scope to that embodiment or otherwise than by the terms of the appended claim.

Having now described my invention, what I claim as new and desire to secure by Letters Patent, is:

In a fluid pressure brake apparatus, the combination with a brake cylinder and a fluid pressure storage means from which fluid under pressure is adapted to be supplied to the brake cylinder, of a valve device operative to control the supply of fluid under pressure to and the release of fluid under pressure from the brake cylinder, said valve device comprising a main casing section having a chamber and a passage leading from said chamber through both of which fluid under pressure is adapted to be supplied to and released from the brake cylinder, a brake cylinder pipe connected to said casing section and establishing communication between said passage and brake cylinder, a fluid pressure supply passage in said casing section, a supply pipe connected to said casing section and establishing communication from said fluid pressure storage means to the supply passage, a valve casing section removably secured to the main casing section and having a fluid pressure supply communication registering with said supply passage and leading to said chamber and having a brake cylinder exhaust communication leading from said chamber to the atmosphere, valve mechanism carried by said valve casing section for controlling said supply and exhaust communications in the valve casing section, said valve casing section and valve mechanism being removable as a unit from the main casing section without disturbing the supply and brake cylinder pipe connections to the valve device, electrically controlled means for controlling the operation of said valve mechanism, and a casing section securing said electrically controlled means to the main casing section, said electrically controlled means and casing section therefor being removable from the main casing section without disturbing said supply and brake cylinder pipe connection or said valve mechanism.

SIDNEY G. DOWN.